United States Patent
Stockhoff et al.

(10) Patent No.: US 11,845,657 B2
(45) Date of Patent: Dec. 19, 2023

(54) INTEGRATED METHOD FOR PRODUCING SULPHUR DIOXIDE QUALITY SUITABLE FOR A SULPHURIC ACID PROCESS FROM CALCIUM SULPHATE/PHOSPHOGYPSUM FROM PHOSPHORIC ACID PRODUCTION

(71) Applicants: thyssenkrupp Industrial Solutions AG, Essen (DE); thyssenkrupp AG, Essen (DE)

(72) Inventors: Peter Stockhoff, Dorsten (DE); Zion Guetta, Dortmund (DE)

(73) Assignees: thyssenkrupp Industrial Solutions AG, Essen (DE); thyssenkrupp AG, Essen (DE)

(*) Notice: Subject to any disclaimer, the term of this patent is extended or adjusted under 35 U.S.C. 154(b) by 0 days.

(21) Appl. No.: 17/791,869

(22) PCT Filed: Jan. 5, 2021

(86) PCT No.: PCT/EP2021/050035
§ 371 (c)(1),
(2) Date: Jul. 8, 2022

(87) PCT Pub. No.: WO2021/140076
PCT Pub. Date: Jul. 15, 2021

(65) Prior Publication Data
US 2023/0126633 A1    Apr. 27, 2023

(30) Foreign Application Priority Data
Jan. 8, 2020   (DE) .................. 10 2020 100 260.2

(51) Int. Cl.
*C01F 11/46*    (2006.01)
*C01B 17/50*    (2006.01)
(Continued)

(52) U.S. Cl.
CPC .......... *C01B 17/745* (2013.01); *C01B 17/506* (2013.01); *C01B 17/56* (2013.01); *C01B 25/232* (2013.01); *C01F 11/468* (2013.01)

(58) Field of Classification Search
CPC ..... C01B 17/745; C01B 17/506; C01B 17/56; C01B 25/232; C01B 17/80; C01B 25/222;
(Continued)

(56) References Cited

U.S. PATENT DOCUMENTS 2,222,740 A * 11/1940 Bornemann .......... C01B 17/506
423/299
2,528,103 A   10/1950 Willson
(Continued)

FOREIGN PATENT DOCUMENTS

AT   284701 B   9/1970
AT   292539 B   4/2005
(Continued)

OTHER PUBLICATIONS

English Translation of International Search Report issued in PCT/EP2021/050035, dated Mar. 2, 2021.
(Continued)

*Primary Examiner* — Timothy C Vanoy
(74) *Attorney, Agent, or Firm* — thyssenkrupp North America, LLC

(57) ABSTRACT

A process for producing sulfuric acid and cement clinker may use calcium sulfate that is formed as a solid by-product and separated off in phosphoric acid production in a reaction of raw phosphate with sulfuric acid to form phosphoric acid. The process comprises treating calcium sulfate separated from the phosphoric acid with an acid to obtain a suspension comprising purified calcium sulfate, separating the purified calcium sulfate in solid form from the liquid phase of the suspension, mixing the purified calcium sulfate with admix-
(Continued)

tures and reducing agents to obtain a raw meal mixture for cement clinker production, burning the raw meal mixture to obtain the cement clinker, with formation of sulfur dioxide as offgas, and subjecting the sulfur dioxide formed to offgas purification and feeding the sulfur dioxide as raw material to sulfuric acid production to produce the sulfuric acid. The sulfuric acid produced may be used as starting material in phosphoric acid production.

15 Claims, 3 Drawing Sheets

(51) Int. Cl.
*C01B 17/56* (2006.01)
*C01B 17/74* (2006.01)
*C01B 25/232* (2006.01)

(58) Field of Classification Search
CPC ........ C01B 17/96; C01F 11/468; C01F 11/46; C04B 7/006; C04B 11/26
See application file for complete search history.

(56) References Cited

U.S. PATENT DOCUMENTS

| | | | | |
|---|---|---|---|---|
| 3,260,035 | A | * | 7/1966 | Wheelock ............... C01B 17/56 95/228 |
| 3,547,581 | A | * | 12/1970 | Muller .................. C01F 11/468 423/178 |
| 3,607,036 | A | * | 9/1971 | Foecking .............. C01B 17/506 423/541.1 |
| 3,652,308 | A | | 3/1972 | Stich et al. |
| 4,312,842 | A | | 1/1982 | Wilson, Sr. et al. |
| 4,415,543 | A | * | 11/1983 | Wilson, Sr. ............. C01B 17/56 423/322 |
| 4,608,238 | A | | 8/1986 | Wilson, Sr. et al. |
| 10,105,648 | B2 | | 10/2018 | Rohloff et al. |

FOREIGN PATENT DOCUMENTS

| | | | | |
|---|---|---|---|---|
| BE | 818 062 | A | * 1/1975 | ............ C01F 11/468 |
| CA | 828060 | A | 11/1969 | |
| CA | 2852131 | A1 | 5/2013 | |
| CN | 1948131 | A | 4/2007 | |
| CN | 102502524 | A | 6/2012 | |
| DE | 19 12 183 | | 10/1970 | |
| DE | 16 46 647 | C3 | 8/1971 | |
| DE | 16 71 215 | A1 | 9/1971 | |
| DE | 32 22 721 | C2 | 12/1983 | |
| DE | 10118142 | A1 | 10/2002 | |
| DE | 10344040 | A1 | 4/2005 | |
| DE | 102012111217 | A1 | 5/2014 | |
| DE | 102014108334 | A1 | 12/2015 | |
| DE | 102017114831 | A1 | 1/2019 | |
| EP | 0 041 761 | A1 | 12/1981 | |
| EP | 1037005 | B1 | 9/2000 | |
| EP | 2449328 | A1 | 5/2012 | |
| EP | 2 771 280 | A1 | 9/2014 | |
| EP | 3 020 468 | A1 | 5/2016 | |
| GB | 120991 | A1 | 12/1918 | |
| JP | 2007-126328 | A | 5/2007 | |
| RU | 2 607 862 | C1 | * 1/2017 | ............. C22B 59/00 |
| SU | 947032 | A1 | 7/1982 | |
| SU | 1604730 | A1 | 11/1990 | |
| WO | 2019-211196 | A1 | 11/2019 | |
| WO | 2019-211202 | A1 | 11/2019 | |
| WO | WO 2020 067 856 | A1 | * 4/2020 | ............... C22B 3/10 |

OTHER PUBLICATIONS

Hilton, Julian, "Phosphogypsum (PG): Uses and Current Handling Practices Worldwide", 25th Annual Lakeland FL, London UK, Regional Phosphate Conference, 53 pages (2010).
Abouzeid, Abdel-Zaher M., "Physical and thermal treatment of phosphate ores—An overview", Int. J. Miner. Process, 85: 59-84 (2008).
Kandil et al., "Ammonium sulfate preparation from phosphogypsum waste". Journal of Radiation Research and Applied Sciences, 10: 24-33 (2017).

* cited by examiner

INTEGRATED METHOD FOR PRODUCING SULPHUR DIOXIDE QUALITY SUITABLE FOR A SULPHURIC ACID PROCESS FROM CALCIUM SULPHATE/PHOSPHOGYPSUM FROM PHOSPHORIC ACID PRODUCTION

CROSS REFERENCE TO RELATED APPLICATIONS

This application is a U.S. National Stage Entry of International Patent Application Serial Number PCT/EP2021/050035, filed Jan. 5, 2021, which claims priority to German Patent Application No. DE 10 2020 100 260.2, filed Jan. 8, 2020, the entire contents of both of which are incorporated herein by reference.

FIELD

The present disclosure generally relates to processes for producing sulfur dioxide using calcium sulfate formed in phosphoric acid production and to plants for performing such processes.

BACKGROUND

Calcium sulfate is a waste product from the phosphoric acid-producing industry and is obtained in the form of the dihydrate and/or hemihydrate in the digestion of phosphate ores with sulfuric acid. The calcium sulfate formed in the production of phosphoric acid is also referred to as phosphogypsum.

As a result of impurities such as phosphorus, fluorine, radioactive components and heavy metals in the calcium sulfate from phosphoric acid production, options are nowadays limited for use of the calcium sulfate, for example as cement admixture, fertilizer, mortar or road building material, and so only 15% of global annual calcium sulfate production from phosphoric acid production is used as such. The remaining 85% of annual calcium sulfate production is either stockpiled or dumped in the ocean.

On account of the current environmental situation, repositories for deposition of the phosphogypsum or dumping of phosphogypsum in the ocean are either permitted only under stricter regulations or not permitted at all.

The phosphogypsum quality achieved from the phosphoric acid process is dependent on factors such as raw phosphate used and process conditions in the digestion of the raw phosphate with sulfuric acid.

The processed raw phosphate can be used for phosphogypsum production by the following processing methods via the possible phosphoric acid processes: 1. calcination, 2. flotation, 3. conversion to monocalcium phosphate or dicalcium phosphate with the aid of inorganic acids. The processes mentioned are known to the person skilled in the art and are described, for example, in Physical and thermal treatment of phosphate ores—An overview; Int. J. Miner. Process. 85 (2008) 59-84; Abdel-Zaher M. Abouzeid; The Fertilizer Manual 3rd Edition; published by UNIDO & IFDC, 1998 edition; ISBN: 0792350324 9780792350323; and Pyroprocessing for the minerals industry; Thyssenkrupp Polysius; identifier: 1625/D (1.0 12.11 Stu).

For every metric tonne of phosphoric acid produced, according to the production method, 4 to 5 tonnes of calcium sulfate are produced. On account of the naturally different qualities/compositions of the phosphate ores and different process parameters for production of phosphoric acid, correspondingly different qualities of calcium sulfonates are also produced.

The elevated demands for handling of the calcium sulfate or phosphogypsum produced present complex challenges to the phosphoric acid-producing industry. Estimates for the storage of phosphogypsum for life are as high as 25 dollars/t of gypsum for the producing companies.

One example of possible commercial and industrial-scale use of calcium sulfate/phosphogypsum which is discussed many times in the literature is the conversion of phosphogypsum to cement clinker or cement and $SO_2$ or sulfuric acid. The conversion of gypsum and phosphogypsum to cement and sulfuric acid by the Müller-Kühne process or by the OSW-Krupp process have long been known; see, for example, patent specifications AT 284701 B or AT 292539 B.

DE 3222721 C2 describes, on the basis of the Müller-Kühne process, an improved method resulting from upstream partial dewatering of the gypsum by centrifuging with subsequent two-stage drying, wherein the $SO_2$-containing offgas exiting from the first drying stage is introduced directly into the gas scrubber of the sulfuric acid plant. The method described does not make any reference to quality of the phosphogypsum with regard to particular components, nor any reference to the quality of the $SO_2$ offgas for the downstream sulfuric acid plant indicated.

Kandil et al., Journal of Radiation Research and Applied Sciences; 10; 2017, describe a process for production of ammonium sulfate from phosphogypsum, in which, in a first step, sulfuric acid is used to leach out $P_2O_5$, F, lanthanides and further constituents. The process described has no association with the conversion of phosphogypsum to cement clinker and sulfuric acid.

EP 0041761 A1 relates, in association with the conversion of phosphogypsum to cement clinker and $SO_2$ gas, exclusively to the recrystallization of calcium sulfate dihydrate to calcium sulfate anhydrite. It is possible to achieve $P_2O_5$ contents of less than 0.01% by weight and fluorine contents of less than 0.05% by weight in the calcium sulfate anhydrite. Calcium components and sulfur dioxide can be obtained at high temperatures from the anhydrite thus obtained. The possibility of recycling spent sulfuric acid into the phosphoric acid process is mentioned, but influencing factors such as grain size of the gypsum and solids to liquid ratio (S/L) that directly affect the water balance in the phosphoric acid complex are not taken into account.

GB 120991 describes the production of cement by the Müller-Kühne process based on calcium sulfate hemihydrate which is produced by recrystallization of calcium sulfate dihydrate in phosphoric acid production. Nowadays, this type of process is known as the DHH (dihydrate-hemihydrate) process. Additionally described is the production of sulfuric acid and portland cement on the basis of the hemihydrate. There is no description of treatment of the calcium sulfate with an acid after separation from the phosphoric acid.

U.S. Pat. No. 3,547,581 relates to a method of processing filtered gypsum from phosphoric acid production, in which the gypsum, after addition of silica and sulfuric acid, is heated up to temperatures of 200° C. to 400° C. and calcined to hemihydrate or anhydrite. The product obtained is washed with water, which can reduce the contents of phosphate and fluoride in the gypsum. On account of the high temperatures required, this is an energy-intensive process comprising a multitude of process steps. Moreover, the method according to U.S. Pat. No. 3,547,581 requires the heating and addition of silica, as compared with the process concept of the invention as presented here. There is no description of production of a suspension by addition of acid to calcium sulfate.

DE 1671215 relates to a process for producing sulfuric acid and cement from waste calcium sulfate, such as phosphogypsum, which discusses the production of the raw meal.

DE 1912183 describes a process for producing low-fluorine cement clinker from phosphogypsum, in which the fluorine in the phosphogypsum is selectively reduced by heating the waste gypsum in the finely ground state to temperatures between 500 and 900° C.

U.S. Pat. No. 4,415,543 describes a process in which the content of fluorides and phosphates in phosphogypsum is reduced by washing with water, followed by heating.

The recovery of sulfur dioxide using calcium sulfate which is formed as a solid by-product in phosphoric acid production and removed by filtration in the reaction of raw phosphate with sulfuric acid to form phosphoric acid is known in principle.

In the production process for cement from phosphogypsum/calcium sulfate, the sulfur is released from the calcium sulfate/phosphogypsum in the form of gaseous sulfur dioxide and driven out in a mixture with the offgas from the clinker process.

In conventional/traditional cement production, the offgas formed is dedusted after utilization of the waste heat, before being emitted into the environment via chimneys. Here, contents of dust particles in the offgas of 5 mg/m$^3$ to 100 mg/m$^3$ are emitted.

For the use of the sulfur dioxide-containing offgas from clinker production from phosphogypsum/calcium sulfate as base material for sulfuric acid production, it is necessary to observe concentrations for components that can adversely affect sulfuric acid production. As well as the dust particles, these also include components that can have an adverse effect in the sulfuric acid process.

For instance, CN102502524B discloses a process for producing sulfur dioxide from calcium sulfate (from phosphogypsum) and elemental sulfur. The starting material here is phosphogypsum, which is first converted by heat treatment to hemihydrate gypsum, mixed together with admixtures and converted to sulfur dioxide and calcium oxide by burning of elemental sulfur. After purification, the sulfur dioxide can be utilized for production of sulfuric acid.

CN1948131A discloses a process by which sulfuric acid can be produced from low-concentration sulfur dioxide offgas from the thermal breakdown of phosphogypsum from phosphoric acid production with addition of highly concentrated sulfur dioxide gas from the combustion of elemental sulfur.

U.S. Pat. No. 4,312,842 A discloses a process for producing phosphoric acid with recovery of the by-products. U.S. Pat. No. 4,608,238 A discloses a process for treating phosphogypsum wastes from phosphoric acid production. U.S. Pat. No. 4,415,543 A discloses a process for treating phosphogypsum wastes from phosphoric acid production. CA 828060A discloses the production of sulfuric acid.

In general, the literature describes merely the respective individual processes such as processing of the phosphogypsum, thermal breakdown of the phosphogypsum to cement clinker and sulfur dioxide. There are only isolated mentions of possible connections with upstream and/or downstream processes.

DETAILED DESCRIPTION

Figure 1:
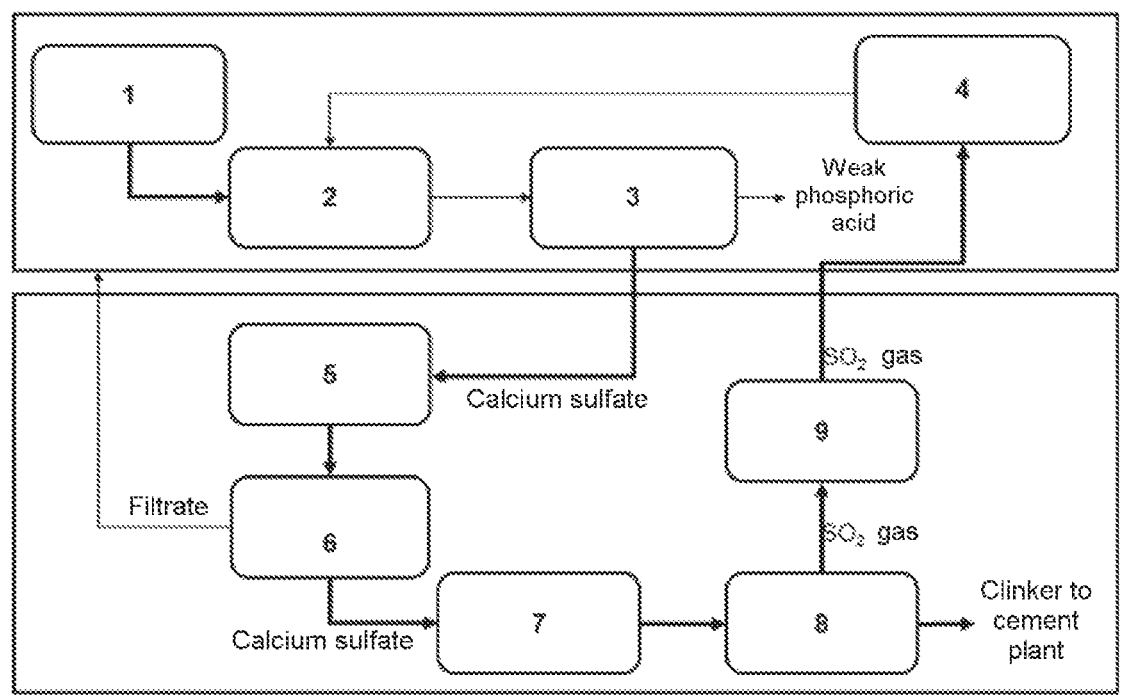
FIG. 1 is a schematic flow diagram for utilization of calcium sulfate from phosphoric acid production with the aid of an integrated complex for production of cement clinker and sulfuric acid.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

One example object of the present disclosure is to provide a method of using calcium sulfate (phosphogypsum) formed in phosphoric acid production for production of products of value, which can be used on an industrial scale in order to meet environmental and economic demands.

Another example object of the present disclosure is to provide a process in which the sulfur dioxide-containing offgas obtained in clinker production is processed with regard to the possible ingredients that can adversely affect the commercially utilized processes for sulfuric acid production. The advantage of this process lies in the flexibility of application of the processing steps required for the respective composition of the SO$_2$-containing offgas. As a result of the possible presence of impurities such as dust, chloride, fluoride, arsenic, mercury, selenium, nitrogen oxides etc., it is necessary to create an individual gas purification concept.

In some examples, a process for producing sulfuric acid and cement clinker may use calcium sulfate that is formed and separated off as a solid by-product in production of phosphoric acid in the reaction of raw phosphate with sulfuric acid to form phosphoric acid. According to some examples, the process comprises the following steps:

a) the calcium sulfate separated from the phosphoric acid is treated with an acid in order to obtain a suspension comprising purified calcium sulfate, b) the purified calcium sulfate is separated in solid form from the liquid phase of the suspension obtained, c) the purified calcium sulfate separated off is mixed with admixtures and reducing agents in order to obtain a raw meal mixture for cement clinker production, d) the raw meal mixture is burnt in order to obtain the cement clinker, with formation of sulfur dioxide as offgas, e) the sulfur dioxide formed is subjected to offgas purification and
f) fed as raw material to sulfuric acid production in order to produce the sulfuric acid, it being possible to use the sulfuric acid produced as starting material in phosphoric acid production and/or send it to another use.

The process of the invention is especially an integrated process. The integrative approach as an overall concept from the phosphogypsum to the cement clinker and sulfur dioxide in the integrated process enables the balancing of the dependences/influencing factors for optimized process selection, combined with the associated flexibility of the process regime with the option of incorporation into existing phosphoric acid and sulfuric acid plant complexes. In this way, it is possible to achieve a mutual balance in the process parameters and process stages of the overall complex for achievement of specific product qualities proceeding from variable reactant characteristics, for example the reactant characteristics of the apatite used in phosphoric acid production or the phosphogypsum from current production or from the stockpile. This has not been considered to date. The combinations of features of the integrative process of the invention cannot be derived from the prior art.

In this connection, the expressions "complex" and "plant" are used interchangeably hereinafter. The liquid phase separated off which is obtained in step b) can be introduced as feedstock into the reaction unit for phosphoric acid production.

Particular advantages of the process of the invention, especially of the integrated process, include the following points:
1. Use of the calcium sulfate/phosphogypsum produced as raw material for production of products of value
2. Conversion of the calcium sulfate/phosphogypsum to cement clinker as raw material for cement production and sulfur dioxide as raw material for sulfuric acid production
3. Reduction of the effects of calcium sulfate/phosphogypsum deposition and/or dumping on the environment
4. Recovery and circulation of the sulfur used in the phosphoric acid process and/or further utilization, which merely gives rise to a need for additional sulfur for compensation of losses in the overall process. General embodiments are circulation of the sulfuric acid or utilization of phosphogypsum from stockpiles. In the latter case, it is necessary to export sulfuric acid since the supply of phosphogypsum from external sources, especially stockpiles, results in a sulfur excess in the overall process. Balancing of the sulfur budget is therefore necessary especially merely with regard to the circulation of sulfuric acid.
5. Increasing the yield of phosphorus from the raw phosphate, and hence better utilization of the raw phosphate used for the purpose of phosphoric acid production
6. Reduction in the CO2 footprint through the use of calcium sulfate/phosphogypsum as raw material for cement clinker production
7. Integrative use of existing plant components of the phosphoric acid and sulfuric acid complex, and hence reduced additional capital costs The integrated process approach described here can be summarized in 5 categories of production processes:
Production of phosphogypsum of suitable quality for the cement clinker process by steps a) and b) of the process of the invention,
Production of the raw meal mixture specific to the cement clinker process by step c) of the process of the invention,
Production of the cement clinker by step d) of the process of the invention and optionally further processing of the cement clinker to cement,
Production of sulfur dioxide gas with a quality suitable for the sulfuric acid process in step d) of the process of the invention, in which case the sulfur dioxide gas may also need to be subjected to offgas cleaning before being supplied to step e),
Production of the sulfuric acid in step f) of the process of the invention.

The process of the invention for production of sulfuric acid and cement clinker using calcium sulfate is preferably integrated into phosphoric acid production. Phosphoric acid production is a customary wet method in which raw phosphate is reacted/digested with sulfuric acid in order to form phosphoric acid (digestion phosphoric acid).

Crude phosphate used is sedimentary and magmatic phosphate rocks, which are generally processed prior to use. The processing typically comprises comminution and concentration with regard to the phosphorus content. For processing, phosphate ore or phosphate rock, especially apatite-containing ore, can be subjected, for example, to a calcination, flotation and/or conversion to monocalcium phosphate or dicalcium phosphate with the aid of inorganic acids.

The production of phosphoric acid by the wet method is common knowledge to the person skilled in the art. General descriptions of the method can be found, for example, in Ullmann's Encyclopedia of industrial chemistry, 5th edition, 1991, vol. A19, "Phosphoric Acid and Phosphate", p. 465-505.

The phosphoric acid production plant preferably comprises a processing unit for phosphate rock, a reaction unit for the reaction of raw phosphate with sulfuric acid, and a filtration unit for removal of calcium sulfate. In general, the phosphoric acid production plant additionally comprises a sulfuric acid production plant, resulting in a phosphoric acid-sulfuric acid complex.

For the production of cement clinker and sulfuric acid by the process of the invention, it is possible, for example, to use calcium sulfate or phosphogypsum from the following existing processes that are known to the person skilled in the art for production of phosphoric acid: 1. dihydrate (DH) process, 2. hemihydrate (HH) process, 3. dihydrate-hemihydrate (DHH) process, 4. hemihydrate-dihydrate (HDH) process and 5. dihydrate attack-hemihydrate filtration (DA-HF) process.

One of the five processes above should be used for the present invention, there being recrystallization of the calcium sulfate in the case of processes 3. to 5. (DHH/HDH/DA-HF), which is not required for the process of the invention.

In the process of the invention, in step a), the calcium sulfate that has been obtained, for example, by one of the abovementioned five processes, after removal from phosphoric acid production, is treated with an acid, which increases the $P_2O_5$ yield.

The calcium sulfate removed from phosphoric acid production is therefore preferably not subjected to any recrystallization before being fed to step a).

In the process for phosphoric acid production, the reaction of raw phosphate with sulfuric acid to form phosphoric acid forms calcium sulfate as a solid by-product which is separated from the phosphoric acid. The separation can be effected, for example, by centrifugation, filtration, settling or concentration, preference being given to mechanical separation. The solid calcium sulfate is preferably separated from phosphoric acid by filtration. The separation comprises or consists of the separation of the calcium sulfate formed from the phosphoric acid (product acid) (first separation), preferably by filtration. Depending on the process, the solid calcium sulfate (preferably filtercake) separated by the first separation can optionally also be subjected to one or more washes with liquid, especially with water, with subsequent removal, preferably by filtration, of the liquid.

The calcium sulfate separated from the phosphoric acid which is used in step a) may be the calcium sulfate obtained directly after the first separation from the phosphoric acid, since no further wash is necessarily required. This enables a reduction in the filter area in the phosphoric acid process. But the calcium sulfate separated from the phosphoric acid which is used in step a) may also be calcium sulfate which, after the first separation from the phosphoric acid, has been subjected to one or more washes with a liquid, preferably water, before being sent to step a).

Alternatively, it is possible to use stockpiled calcium sulfate from phosphoric acid production as the calcium sulfate which is used in step a). It may be necessary to subject the stockpiled calcium sulfate to additional mechanical pretreatment prior to use in step a). It is also possible to wash the stockpiled calcium sulfate prior to the use in step a) by means of one or more washes with a liquid, preferably water.

The reaction of raw phosphate with sulfuric acid takes place in the phosphoric acid production complex in the reaction unit of the phosphoric acid plant. The reaction mixture obtained is then conveyed to the separation unit, preferably filtration unit, of the phosphoric acid plant, where the phosphoric acid is separated from/filtered out of the calcium sulfate formed in one or more separation stages. The calcium sulfate for use in stage a) is taken from the separation unit or filtration unit, preferably from the first separation stage, and/or the calcium sulfate used in stage a) is stockpiled calcium sulfate from phosphoric acid production.

The calcium sulfate separated off which is used in step a) is preferably calcium sulfate in the form of dihydrate, hemihydrate or a combination thereof.

In step a) of the process of the invention, the calcium sulfate separated off from phosphoric acid production is treated with acid. The acid is added to the calcium sulfate in order to perform the treatment. In this way, after the treatment, a suspension comprising purified calcium sulfate is obtained. The suspension obtained may, for example, be a sludge or slurry. The treatment can reduce the level of impurities in the calcium sulfate that adversely affect the downstream cement clinker process and cement quality to the content required by the downstream cement clinker process.

An acid is added for treatment of the calcium sulfate in step a). The acid is preferably a dilute acid. Dilute acids are acids that have been diluted with water (aqueous acids). The acid, preferably the dilute acid, is preferably an inorganic acid, e.g. hydrochloric acid, nitric acid, sulfurous acid and/or sulfuric acid, particular preference being given to sulfurous acid and/or sulfuric acid.

In step a), the acid is preferably added in such an amount that the ratio of solids to liquid (S/L ratio) in the suspension is in the range from 1/10 to 1/1, preferably 1/5 to 1/1, more preferably 1/5 to 1/1.3, even more preferably 1/4 to 1/2. The ratio of solids to liquid (S/L ratio) is based on the mass of solids in kilograms and the volume of the liquid in liters at a reference temperature of 20° C.

The concentration of the acid used is chosen here such that the acid resulting from the treatment in step a) is, for example, in the range from 1 to 12 molar, preferably in the range from 3 to 10 molar, more preferably in the range from 5 to 8 molar, the acid being an aqueous acid. What is meant by 1 molar here is 1 mol of acid per 1 liter of solution at 20° C. Since the calcium sulfate to be treated may contain water, the concentration of the acid added may be higher than the concentration of the acid resulting after the addition. In general, the molarity of the acid added is preferably within the ranges specified above and hereinafter for the resulting acid.

The acid resulting from the treatment after step a) is preferably a 1 to 12 molar, preferably 5 to 8 molar, sulfurous acid or a 1 to 12 molar, preferably 5 to 8 molar, sulfuric acid. The acid added is therefore preferably a sulfurous acid or a sulfuric acid.

The treatment in step a) is conducted, for example, at a reaction temperature in the range between ambient temperature and boiling point of the reaction mixture, for example at a temperature in the range from 15° C. to 100° C., preferably 30° C. to 80° C., more preferably 45 to 75° C.

The duration of treatment in step a) or the reaction dwell time for the establishment of the contents of impurities in the acid is, for example, in the range from 5 minutes to 120 minutes, preferably from 15 to 100 minutes, in particular 15 to 90 minutes, especially preferably 20 to 60 minutes.

During the treatment of step a), the suspension or reaction mixture for adjustment of the contents of impurities is preferably kept in motion, for example by circulation, stirring or blowing in gas.

For step a), the calcium sulfate generated in phosphoric acid production is fed from the separation unit, preferably filtration unit, of the phosphoric acid production to a calcium sulfate reaction unit, or the calcium sulfate from a stockpile from phosphoric acid production. The calcium sulfate is treated with the acid added therein. The calcium sulfate reaction unit may be a simple stirrer device, for example stirred vessel.

In step b) of the process of the invention, the purified calcium sulfate, after treatment in solid form, is separated from the liquid phase of the suspension obtained. The suspension obtained may be a slurry. The separation of solids or purified calcium sulfate and liquid phase from the suspension is especially a mechanical separation and can be effected, for example, by centrifugation or filtration, preference being given to filtration.

The purified calcium sulfate obtained in step b) as obtained after the separation may be dihydrate, hemihydrate, anhydrite or in the form of a mixture of at least two of said components, preference being given to calcium sulfate in the form of anhydrite. The desired composition of the calcium sulfate is dependent on the required degree of $P_2O_5$ reduction; a cement/clinker producer will determine the required degree of $P_2O_5$ reduction. The treatment with acid and subsequent separation from the liquid phase can especially reduce the content of fluorine and phosphorus in the calcium sulfate that are present as impurities. The liquid phase removed is generally an acid-containing aqueous solution comprising water and $P_2O_5$ inter alia.

According to one example, the purified calcium sulfate separated off which is obtained in step b) contains at least 5% by weight, preferably at least 30% by weight, or even at least 50% by weight, of anhydrite, based on dry calcium sulfate.

The $D_v(50)$ of the grain size distribution of the calcium sulfate produced in step b), especially calcium sulfate anhydrite, after the purification is, for example, 0.5-100 µm, especially preferably 1-50 µm, in particular 2-30 µm. The $D_v(50)$ is defined as the value at which 50% by volume of the particles have a greater diameter than the value specified is.

In a preferred embodiment, in step b), the liquid phase which is obtained after the solids have been separated off is used as feedstock in phosphoric acid production. The liquid phase or filtrate may be used in existing phosphoric acid production, especially in the existing phosphoric acid-sulfuric acid complex, as "recycle acid", which can be fed to the reaction unit for phosphoric acid production for reaction with the raw phosphate.

For step b), the suspension/slurry present in the calcium sulfate reaction unit is transferred to a calcium sulfate separation unit in which the liquid and the resulting solids (purified calcium sulfate) can be separated from one another. The separation unit may, for example, be a filtration unit or a centrifuge unit, preference being given to a filtration unit.

It is possible to directly use the purified calcium sulfate separated off that has been obtained in step b) as purified and processed calcium sulfate separated off. It is alternatively possible that the purified calcium sulfate obtained in step b) is subjected to one or more further purification steps, especially for removal of rare earths and optionally for removal of radioactive elements and/or heavy metals, for example Cd, Pb, Hg, before the purified calcium sulfate is sent to step c). The optional additional purification steps are elucidated hereinafter.

The purified calcium sulfate used in step c) preferably has a $P_2O_5$ content of less than 0.5% by weight, preferably less than 0.25% by weight, more preferably less than 0.05% by weight, and a fluoride content of less than 0.5% by weight, preferably less than 0.25% by weight, more preferably less than 0.15% by weight, even more preferably of less than 0.05% by weight. A purified calcium sulfate having the level of purity mentioned with regard to $P_2O_5$ and fluorine is preferably obtained directly after step b). The purification step of steps a) and b) and any purification step for removal of rare earths may possibly also fully or partly remove unwanted heavy metals and/or radioactive elements, especially radioactive elements, that are present in the calcium sulfate.

In step c) of the process of the invention, the purified and processed calcium sulfate separated off is mixed with admixtures and reducing agents in order to obtain a raw meal mixture for cement clinker production. The calcium sulfate is mixed here in the correct ratio with the necessary admixtures for the required cement clinker quality. As already stated, the Müller-Kühne process and the OSW-Krupp process for the reaction of calcium sulfate with admixtures and reducing agents to give cement clinker and $SO_2$ or sulfuric acid have long been known. Further details in this regard can be found in the specialist literature, for example Ullmann's Encyclopedia of industrial chemistry, 5th edition, 1986, vol. A5, "Cement and Concrete", p. 489-537, or patent specification AT 292539 B. In general, cement clinker is produced from a raw material mixture referred to as raw meal, comprising calcium oxide, silicon dioxide and oxides of aluminum and iron; see, for example, Ullmann's Encyclopedia of industrial chemistry, 5th edition, 1986, vol. A5, "Cement and Concrete", p. 489-537 or patent specification AT 292539 B.

Components for production of the raw meal in step c) may, as well as purified phosphogypsum/calcium sulfate, be the admixtures known to the person skilled in the art for the clinker composition which are mixed into the calcium sulfate, with formation of the calcium component entirely from the purified calcium sulfate removed in the raw meal mixture. "Entirely" here does not rule out the possibility that calcium may be present in small amounts or as impurities in the admixtures. "Entirely" here means that at least 95%, more preferably at least 99%, even more preferably at least 99.9%, of the calcium present in the cement clinker comes from the purified calcium sulfate separated off. As a result, the admixtures used are free or largely free of calcium. Additives are especially Al carriers, for example bauxites, clays and tonsteins, shales, etc., Fe carriers, for example iron ores, laterites, etc. and Si carriers, for example sands, sandstones, quartzites, clays and tonsteins, shales, etc. and one or more reducing agents, for example a carbon and/or hydrocarbon carrier, e.g. charcoal, coke, petcoke or charcoal/coke produced from renewable raw materials (biocharcoal/coke), and/or elemental sulfur.

It will be apparent that the type and amount of the admixtures are chosen such that, together with the calcium sulfate, they result in a raw meal having suitable chemical composition for a cement clinker.

Suitable fuels are solid fuels, for example charcoal, coke, petcoke, solid secondary fuels, etc. and liquid fuels, for example oil, heavy oil, liquid secondary fuels, etc. or gaseous fuels, for example natural gas, biogas, hydrogen, or else a combination of aforementioned fuels.

Additives and/or mineralizers for accelerated breakdown of the purified calcium sulfate and/or for improved formation of clinker minerals may likewise be added.

Raw meal for the production of cement clinker refers to the mixture of substances comprising calcium sulfate, all admixtures that are customary for cement, and additives/mineralizers including reducing agents.

For the raw meal preparation in step c), the purified calcium sulfate is preferably dried to a desired residual moisture content, for example in a drum dryer and/or entrained flow dryer and/or fluidized bed; the water content of the dried calcium sulfate is, for example, below 22% by weight, preferably 12-14% by weight, more preferably below 5% by weight, even more preferably below 1% by weight. The water content here is based solely on free water; any water of hydration present is not taken into account.

The dried calcium sulfate and all the customary admixtures are sent to a conventional tank and/or mixing device. Useful examples that are employed for this purpose include an elongated mixing bed and/or round mixing bed and/or trough tank and/or open-air tank and/or conventional silos, such as a tangentially mixed silo, multi-cell silo, conical silo or multichamber silo. For example, such a mixing bed is described in detail in DE 10252585, or such silo types in DE10118142 or DE 10344040.

The raw materials (calcium sulfate and admixtures) are ground separately or collectively to the fineness needed for the clinker process. This comminution may be executed as a mill-drying operation, in which the waste heat from the process (e.g. preheated gases) and/or specially supplied heat (e.g. offgases from a hot gas generator) are utilized.

Comminution equipment used for the comminution is equipment such as at least one vertical roll mill and/or a roll press and/or a stirred ball mill and/or ball mill and/or vertical roller mill and/or rod mill and/or magnetic mill. Corresponding equipment is known, for example, from property rights DE 102012111217, DE 102014108334 or DE 102017114831.

The ground raw materials are fed collectively or separately to one or more silos for intermediate storage and/or homogenization.

The chemical composition of the raw meal mixture, before being introduced into the clinker process, is checked continuously and, in the case of variances from defined target values, corrected by changes in the dosages.

The raw meal thus pretreated is introduced into the clinker plant in a dosed manner, optionally together with reducing agent.

The reducing agent serves to assist the elimination of SO2 in the thermal breakdown of the purified calcium sulfate. The reducing agent is crushed and/or ground separately to the necessary fineness. This comminution may be executed as a mill-drying operation. The reducing agent thus prepared is fed together with the pretreated raw meal to the clinker plant and/or separately at one or more points to the clinker plant.

Alternatively, the raw meal may be supplied with a liquid content of the mixture of 9% by weight—22% by weight, preferably between 12% by weight—14% by weight, to a shaping device for production of agglomerates. These agglomerates may be dried and stored intermediately in a separate device. The raw meal thus agglomerated is then fed to the preheating device and the burning process. The agglomerates have a size of more than 250 µm, preferably more than 500 µm, down to the low mm range. Shaping equipment employed may, for example, be a press and/or a pan and/or a drum and/or a mechanical fluidized bed reactor and/or a shaping stirred mixer.

In step d) of the process of the invention, the raw meal which is produced in step c) is converted to cement clinker by a thermal process, especially in a cement clinker process unit, with formation of sulfur dioxide as offgas. The cement clinker produced in step d) can be used for cement production.

In step d), the raw meal is preferably preheated to a temperature of up to 800° C. with process gases from the burning or cooling process for reduction of energy consumption, which drives out adhering surface moisture and at least partly calcines the admixtures.

On further preheating above 800° C., the majority of the calcium sulfate is broken down under the action of the reducing agent to form $SO_2$.

The preheating and breakdown of the raw meal can be conducted, for example, in a heat exchanger, preferably an entrained flow heat exchanger.

The $SO_2$-containing process gas is preferably separated out here by a separation system downstream of the preheating device and sent to a utilization process, for example a sulfuric acid plant.

In a subsequent step, the final breakdown of the raw meal and subsequent formation of the cement clinker (clinker burning) is effected; the process gases from this step are sent to the heat exchanger. This burning of the raw meal is effected in a furnace, preferably a rotary furnace. The burning temperature for cement clinker production may, for example, be in the range from 1200° C. to 1600° C., preferably at a temperature of 1200° C. up to 1500° C. The combustion time may, for example, be 5 minutes to 60 minutes.

In a preferred embodiment, the raw meal is burnt with oxygen-enriched process air containing more than 21% by volume, preferably more than 45% by volume, more preferably more than 60% by volume, and up to 100% by volume, of oxygen. Corresponding process air can readily be produced by mixing in oxygen. This is a particularly preferred embodiment of the oxyfuel process. Details of the oxyfuel process are described, for example, in EP 2449328 A1, EP 1037005 B1, WO 2019-211196 A1, WO 2019-211202 A1 or JP 2007-126328 A, and reference is made thereto.

The use of oxygen-enriched process air can increase the concentration of $SO_2$ in the process gas; this facilitates the recovery of sulfuric acid from $SO_2$-containing gases.

The abovementioned process air may have been utilized beforehand for cooling of the burnt material. It is likewise conceivable that this process air is fed directly to the furnace. It would likewise be conceivable that the process gas is at least partly drawn off in a bypass system and/or from the entrained flow reactor, then enriched with oxygen and fed back to the burning process.

The clinker coming from the furnace is preferably cooled down by a suitable cooling system to a temperature below 120° C., preferably below 100° C. The cooler output air may be supplied at least partly to the burning process and/or the preheating process and/or the raw meal production and/or the calcium sulfate drying. The process air fed to the cooling system may at least partly be enriched with oxygen. It would likewise be conceivable for at least a portion of the cooler output air to be utilized for power generation. The material cooled down by the cooling process, after possible further process steps, is sent to a tank facility and/or packing facility.

The cement clinker thus produced can be processed further to cement. The cement clinker or cement produced by this method has a smaller $CO_2$ footprint than customary clinker or cement produced on the basis of carbonate rocks.

The abovementioned processes, for example use of phosphogypsum as $CO_2$-neutral raw material and the use of the oxyfuel process lower the CO2 footprint of the cement plant. In addition, the use of at least partly renewable power for operation of the plant components can further reduce the CO2 footprint.

In step e) of the process of the invention, the sulfur dioxide formed in step d) is subjected to a gas purification.

The sulfur dioxide to be purified leaves the clinker process unit preferably at a temperature of 200° C. to 450° C. If appropriate, the sulfur dioxide to be purified is pre-cooled to this temperature in a cooling unit.

The process of one example of the present disclosure is characterized in that the purifying of the sulfur dioxide in step e) comprises the step e1) of dry deposition of particles.

According to the present disclosure, this step preferably separates out particles having a size of greater than 100 µm.

The purification of the sulfur dioxide in step e) further comprises the following optional steps e2), e3) and e4).

Step e2) comprises a wet deposition, according to the present disclosure in order to separate out particles having a size of 20 to 100 µm.

Step e3) comprises a separation, a dry shutdown, of particles having a size of less than 20 µm.

Step e4) comprises a separation of nitrogen oxides from the sulfur dioxide gas.

The process of the invention is preferably characterized in that the dry deposition of particles from the sulfur dioxide in steps e1) and/or e3) is undertaken by means of a cyclone, rotational flow separator and/or dry electrofilter.

The process of the invention is preferably characterized in that the wet deposition of particles from the sulfur dioxide in step e2) is undertaken by means of a Venturi scrubber, quench/column scrubber and/or wet electrofilter.

The process of the invention is preferably characterized in that residual moisture that may be present in the sulfur dioxide after the wet deposition is removed by condensation.

The process of the invention is preferably characterized in that nitrogen oxides are separated from the sulfur dioxide in step e4) by means of breakdown of the nitrogen oxides to $N_2$ and $H_2O$. Processes utilizable for this purpose are known to the person skilled in the art and are described, for example, in Handbook of Sulphuric Acid Manufacturing, by Douglas K. Louie, 2nd edition 2008, published by DKL Engineering.

The nitrogen oxides are preferably broken down by methods of gas treatment such as selective catalytic reduction, selective noncatalytic reduction and/or by means of scrubber technologies, or by means of wet-chemical conversion in the liquid phase in the sulfuric acid process.

The expression "selective catalytic reduction" (SCR) refers to a technique for reduction of nitrogen oxides in offgases. The chemical reaction over the SCR catalyst is selective, meaning that the nitrogen oxides (NO, $NO_2$) are preferentially reduced, while unwanted side reactions are largely suppressed.

Ammonia is preferably mixed into the offgas for the reaction. The products of the reaction are water ($H_2O$) and nitrogen ($N_2$). The reaction is a comproportionation of the nitrogen oxides with ammonia to give nitrogen. It is possible to use two kinds of catalyst: the first preferably consists predominantly of titanium dioxide, vanadium pentoxide and tungsten dioxide; the other preferably uses zeolites.

The $SO_2$ purified in step e) is fed in step f) as raw material to sulfuric acid production in order to produce sulfuric acid, for example by the single-contact or double-contact method. Sulfuric acid production based on $SO_2$ is very familiar to the person skilled in the art. Details thereof can be found in the technical literature, for example Handbook of Sulphuric Acid Manufacturing, by Douglas K. Louie, 2nd edition 2008, published by DKL Engineering, or Ullmann's Encyclopedia of industrial chemistry, 5th edition, 1994, vol. A25, "Sulfuric Acid and Sulfur Trioxide", p. 635-705.

The sulfuric acid produced in step f) may be used, for example, in phosphoric acid production as starting material for the reaction with the raw phosphate. Alternatively, the sulfuric acid produced, as required, can be sent to a further or another utilization. The treated sulfur dioxide gas can optionally be fed to the sulfuric acid production plant existing in the phosphoric acid production or to a new sulfuric acid production plant.

In an optional variant of the process of the invention, the process comprises an additional purification step for the calcium sulfate obtained after step b), which is performed before the calcium sulfate is mixed with the admixtures and reducing agents in step c). In this additional purification step, it is possible to wash any rare earth metals present as an impurity out of the calcium sulfate.

In the optional additional purification step for removal of rare earths from the calcium sulfate before supplying to step c), the purified calcium sulfate obtained in step b) is preferably treated with a liquid, preferably water or an aqueous solution containing salt and/or chelate ligand. After the treatment, the calcium sulfate is separated in solid form from the liquid phase in the suspension thus obtained. The calcium sulfate purified further and separated off in this way is then supplied to step c). The liquid phase contains one or more rare earths as dissolved ions and can be sent to further processing to recover the rare earths. For example, this processing operation comprises the conversion of sparingly soluble rare earth sulfates to soluble forms.

The process of the invention can also serve to remove radioactive elements and/or heavy metals. The resultant purified calcium sulfate after step b), given suitable adjustment of the reaction conditions (S/L ratio, dwell time, concentration of acid and temperature), shows distinct depletion of radioactive elements, for example thorium and uranium. In the further optional purification step for recovery of rare earths, it is additionally possible to remove heavy metals (and further radioactive constituents), for example cadmium and lead, through suitable choice of the workup step. The purified calcium sulfate, before being supplied to step c), may therefore have a reduced content of phosphorus and fluorine and possibly of rare earths, radioactive elements and/or heavy metals. It will be apparent that the reduced content of the respective element relates to the comparison with the content of the respective element in the calcium sulfate which is supplied to step a).

The integrative approach or integrative process of the invention is especially characterized by the following features or advantages:
- The process for production of cement clinker or cement, with regard to the starting quality of the phosphogypsum, can be run flexibly and in combination with the phosphoric acid process,
- The sulfuric acid produced from the $SO_2$ offgas can be introduced into the overall complex and consumed, and also generated and, for example, circulated,
- The following processing operations may be combined, for example, in their entirety or optionally for the production of cement clinker/cement and sulfuric acid from calcium sulfate:
  - Chemical and thermal modification of the phosphoric acid process for specific production of a phosphogypsum quality suitable for the cement clinker process
  - Mechanical removal of the phosphogypsum from the running phosphoric acid process, for example by centrifugation, filtration, evaporation or settling/sedimentation of the calcium sulfate/phosphogypsum sludge
  - Chemical-thermal and mechanical separation of phosphorus from the phosphogypsum, for example by chemical conversion, recrystallization, precipitation, flocculation
  - Chemical-thermal and mechanical separation of fluorine from the phosphogypsum, for example by chemical conversion, recrystallization, precipitation, flocculation
  - Chemical-thermal and mechanical separation of radioactive components from the phosphogypsum, for example by chemical conversion with heating/cooling, recrystallization, precipitation, flocculation
  - Chemical-thermal and mechanical separation of heavy metals from the phosphogypsum, for example by chemical conversion with heating/cooling, recrystallization, precipitation, flocculation
  - Chemical-thermal and mechanical separation of rare earths from the phosphogypsum, for example by chemical conversion with heating/cooling, recrystallization, precipitation, flocculation
  - Chemical and/or thermal and/or mechanical dewatering of the phosphogypsum, for example by heating/cooling, flocculation and precipitation, filtration
  - Mechanical treatment of the dry phosphogypsum, for example by comminuting, sifting
  - Mixing of the phosphogypsum with additives to give a raw meal mixture for achievement of specific and commercial cement clinker/cement qualities
  - Thermal and mechanical separation of the sulfur dioxide from the raw meal mixture in the course of the burning process in the cement clinker production
  - Thermal and chemical conversion of the raw meal mixture to cement clinker
  - Chemical and mechanical conversion of the cement clinker to commercial cement quality Dry- and wet-chemical purification of the sulfur dioxide-containing offgas separated off, for example by electrofiltration, absorption Chemical and thermal modification of the sulfuric acid process for incorporation and use of the sulfur dioxide generated into plants for production of sulfuric acid Chemical conversion of the purified sulfur dioxide-containing offgas to sulfuric acid of commercial quality which is reusable in the phosphoric acid process, for example by the single-contact or double-contact process.

According to the available quality of the calcium sulfate used, the production processes have to be chosen flexibly and matched to one another in terms of the choice of chemical process operations and parameters. The quality of the calcium sulfate achieved from the phosphoric acid process is dependent on factors such as raw phosphate used and process conditions in the digestion of the raw phosphate with sulfuric acid.

The extent of the purification, especially with regard to the reduction in the phosphorus and/or fluorine content, of the calcium sulfate in step a) may be adjusted with reference to the impurities present in the admixtures used, and the guide values for fluorine and phosphorus to be observed for the cement clinker. The guide values for phosphorus are preferably not more than 1.0% by weight, more preferably not more than 0.5% by weight, even more preferably not more than 0.1% by weight, of $P_2O_5$, and/or the guide values for fluorine are preferably not more than 0.5% by weight, more preferably not more than 0.25% by weight, even more preferably not more than 0.1% by weight, of F. This is possible on account of the integrative approach, since all process steps are considered collectively with reference to their respective demands. The extent of purification can be established via the adjustment of the parameters in step a), for example S/L ratio, concentration of the acid, and treatment temperature and time.

The liquid budget, especially the water budget, of phosphoric acid production is changed only insignificantly, if at all, by the integrated process, especially since the liquid input, especially water input, for purification of the calcium sulfate in the process in step a) can be coupled to the liquid budget, especially water budget, of phosphoric acid production. The liquid budget or water budget of phosphoric acid production comprises the liquid or water which is supplied to the production, and the liquid or water which is discharged from the production. Changes in the liquid budget, especially water budget, have a significant influence on the efficiency of the process steps in phosphoric acid production.

The invention also relates to a plant for production of sulfuric acid and cement clinker using calcium sulfate which is formed and separated off as a solid by-product in phosphoric acid production in the reaction of raw phosphate with sulfuric acid to form phosphoric acid, wherein the plant comprises the following devices:

a) a calcium sulfate reaction unit suitable for treating the calcium sulfate separated from the phosphoric acid therein with an acid in order to obtain a suspension comprising purified calcium sulfate, b) a calcium sulfate separation unit suitable for separating the purified calcium sulfate in solid form from the liquid phase of the suspension obtained, c) a raw meal mixing unit suitable for mixing the purified calcium sulfate separated off with admixtures and reducing agents therein in order to obtain a raw meal mixture for cement clinker production, d) a cement clinker production unit, especially a combination of a preheater, at least one burner device and a cooler that are suitable for preheating, burning and cooling the raw meal mixture in order to obtain the cement clinker, with formation of sulfur dioxide as offgas, e) a sulfur dioxide offgas purification plant which is suitable for removing impurities from the sulfur dioxide offgas, and/or f) a sulfuric acid production plant which is supplied with the sulfur dioxide offgas that has been formed in the cement clinker production unit and optionally purified as raw material, in order to produce sulfuric acid, wherein the sulfuric acid production plant may be part of the phosphoric acid production plant or an external sulfuric acid production plant.

The sulfuric acid production plant in step f) preferably works by the single-contact or double-contact method. Sulfuric acid production based on $SO_2$ is very familiar to the person skilled in the art. Details thereof can be found in the technical literature, for example Handbook of Sulphuric Acid Manufacturing, by Douglas K. Louie, 2nd edition, 2014, or Ullmann's Encyclopedia of industrial chemistry, 5th edition, 1994, vol. A25, "Sulfuric Acid and Sulfur Trioxide", p. 635-705.

The plant may be used for the above-described process of the invention. For details relating to the individual devices or units, reference is made to the above details thereof. The above details for the process are correspondingly applicable to the plant.

It is preferable that, in the plant of the invention, the calcium sulfate separation unit is connected fluidically, for example via a pipeline, to the phosphoric acid production plant, in order that the liquid phase obtained in the calcium sulfate separation unit can be introduced as feedstock into the phosphoric acid production.

It is preferable that, in the plant of the invention, the calcium sulfate separated off for step a) can be supplied by a separation unit in phosphoric acid production that separates the phosphoric acid from the calcium sulfate, or from a stockpile of calcium sulfate from phosphoric acid production.

FIG. 1 shows a flow diagram of phosphoric acid production (existing complex) and an integrated process for production of cement clinker and sulfuric acid from calcium sulfate that originates from phosphoric acid production (integrated complex). The phosphate rock is processed in a processing unit 1 in order to obtain the raw phosphate. The raw phosphate is reacted in the reaction unit of the phosphoric acid plant 2 with sulfuric acid coming from the sulfuric acid production plant, in order to form phosphoric acid and solid calcium sulfate as by-product. The calcium sulfate generated in phosphoric acid production is separated from the phosphoric acid in filtration unit 3 of the phosphoric acid plant and sent to the calcium sulfate reaction unit 5. The calcium sulfate is treated there with acid, such that, after the treatment, for example, a 1-12 molar acid, especially a 1-12 molar sulfuric acid, is obtained. For example, it is possible to add a 1-12 molar sulfuric acid for treatment. The treatment can be conducted after addition of the acid, for example, at a temperature of 15-100° C. for 5 to 120 min, preferably with movement of the suspension obtained, for example by stirring. This reduces the level of impurities in the calcium sulfate that adversely affect the downstream cement clinker process and cement quality to the content required by the cement clinker process. In a calcium sulfate separation unit 6, which is preferably a filtration unit, the liquid and the resulting solids are separated from one another. The liquid, especially the filtrate, can be used in the existing phosphoric acid-sulfuric acid complex. The treated calcium sulfate is sent to the raw meal preparation unit 7 upstream of the cement clinker process. The calcium sulfate is mixed therein with the necessary admixtures for the required cement clinker quality in the correct ratio. The cement clinker raw meal prepared is used to charge the cement clinker process unit 8, preferably with preheating of the raw meal in a heat exchanger prior to supply to the process unit 8 (not shown). In the cement clinker process unit 8, sulfur dioxide is separated from the calcium sulfate and fed as offgas from the cement clinker process unit to the sulfur dioxide offgas treatment 9. The treated sulfur dioxide gas may optionally be supplied to the existing sulfuric acid production plant 4. Alternatively, the treated sulfur dioxide gas may optionally be supplied to a new sulfuric acid production plant (cf. 13 in FIG. 2). The calcium remaining in the cement clinker process unit is reacted with the admixtures to give cement clinker. The combustion temperature for cement clinker production may, for example, be at a temperature in the range from 1200° C. to 1600° C. and a combustion time of 5 minutes to 60 minutes. The cement clinker thus produced is cooled and can be processed further to cement.

Figure 2:
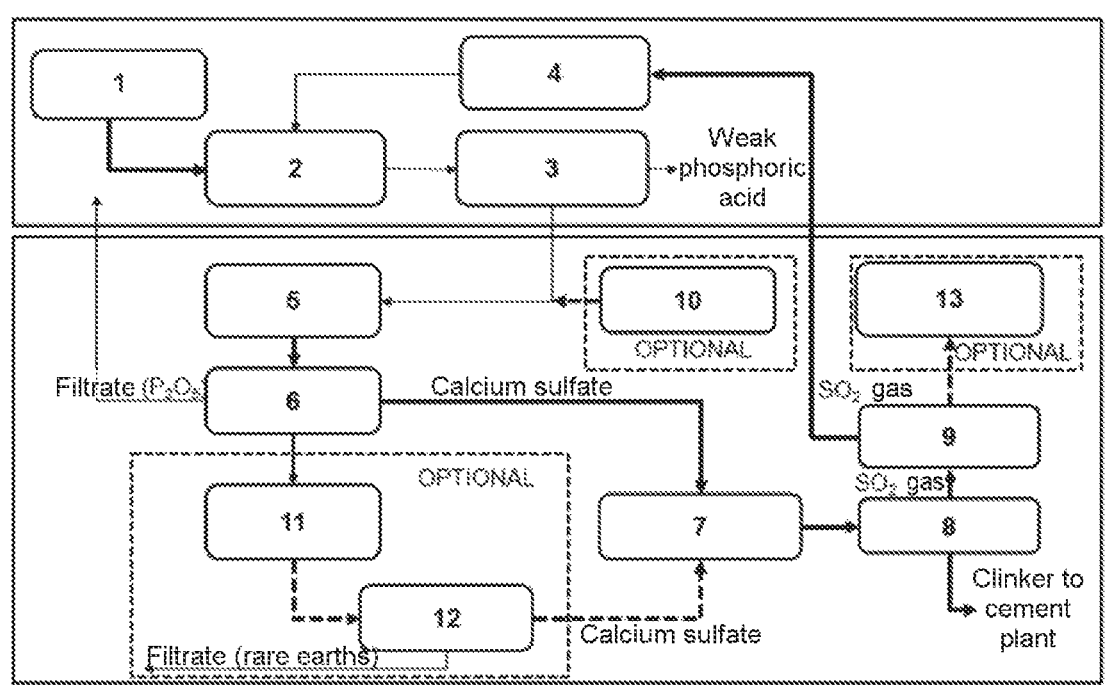
FIG. 2 is a schematic flow diagram for utilization of calcium sulfate from phosphoric acid production by means of an integrated complex for production of cement clinker and sulfuric acid as in FIG. 1, additionally showing alternative or additional process steps.

FIG. 2 shows a schematic flow diagram for utilization of calcium sulfate from phosphoric acid production by means of an integrated complex for production of cement clinker and sulfuric acid according to FIG. 1, additionally showing alternative or additional process steps. There follows a discussion of the alternative or additional process steps; otherwise, reference is made to the elucidations relating to FIG. 1. FIG. 2 shows an alternative source for the calcium sulfate used in step a). Rather than the calcium sulfate from the filtration unit of the phosphoric acid plant 3, it is possible to use a calcium sulfate from a stockpile 10 for the calcium sulfate used in step a), this being deposited calcium sulfate from phosphoric acid production. In addition, FIG. 2 shows the optional processing step for removal of rare earths, which comprises a reaction unit for recovering rare earth metals from the calcium sulfate 11 and the calcium sulfate separation unit 12 for separation of the liquid phase from the purified calcium sulfate. FIG. 2 also shows that the sulfur dioxide obtained from the SO₂ treatment 9 can be used for the recovery of sulfuric acid in the existing sulfuric acid production plant 4 and/or a new sulfuric acid production plant 13.

Figure 3:
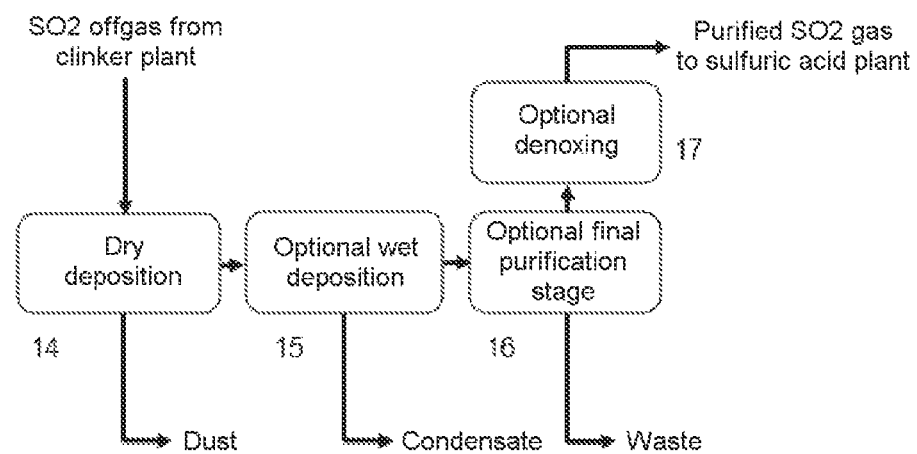
FIG. 3 is a schematic flow diagram for purification of the SO$_2$ gas that is obtained in the production of cement clinker.

FIG. 3 shows a schematic flow diagram for purification of the SO₂ gas in the sulfur dioxide offgas treatment plant 9. For this purpose, the SO₂ offgas from the clinker plant is first sent to a dry deposition 14, preferably in order to separate out particles having a size of greater than 100 µm. In addition, the gas processing operation may comprise a downstream optional wet separation 15, preferably in order to separate out particles having a size of 20 to 100 µm, and an optional separation of particles 16 preferably having a size of less than 20 µm. Downstream of the particle deposition plants 14, 15, 16 is preferably connected a plant to separate off nitrogen oxides 17.

LIST OF REFERENCE NUMERALS

1 Processing unit for phosphate rock or phosphate ore
2 Reaction unit of the phosphoric acid plant
3 Filtration unit of the phosphoric acid plant
4 Sulfuric acid production plant (existing)
5 Calcium sulfate reaction unit
6 Calcium sulfate separation unit
7 Raw meal preparation unit
8 Cement clinker process unit
9 Sulfur dioxide offgas treatment
10 Calcium sulfate from stockpile (from phosphoric acid production)
11 Recovery of rare earths from calcium sulfate
12 Calcium sulfate separation unit
13 Sulfuric acid production plant (new)
14 Dry deposition
15 Optional wet deposition
16 Optional final purification stage
17 Optional removal of nitrogen oxides

What is claimed is:

1. A process for producing sulfuric acid and cement clinker using calcium sulfate that is formed as a solid by-product and separated off in phosphoric acid production in a reaction of raw phosphate with sulfuric acid to form phosphoric acid, wherein the process comprises:
   (a) treating the calcium sulfate that is separated off from the phosphoric acid with an acid to obtain a suspension comprising purified calcium sulfate;
   (b) separating the purified calcium sulfate in solid form from a liquid phase of the suspension, wherein the purified calcium sulfate that is separated off contains at least 50% by weight of anhydrite based on dry calcium sulfate;
   (c) mixing the purified calcium sulfate that is separated off with admixtures and reducing agents to obtain a raw meal mixture for cement clinker production;
   (d) burning the raw meal mixture to obtain the cement clinker, forming sulfur dioxide as an offgas;
   (e) subjecting the sulfur dioxide to offgas purification, wherein the offgas purification comprises:
      (e1) dry depositioning particles having a size greater than 100 µm,
      (e2) wet depositioning particles having a size of 20 to 100 µm,
      (e3) removing particles having a size less than 20 µm, and
      (e4) removing nitrogen oxides; and
   (f) feeding the sulfur dioxide as raw material to a sulfuric acid production to produce the sulfuric acid.

2. The process of claim 1 being an integrated process.

3. The process of claim 1 wherein the phosphoric acid production is executed by a process selected from a dihydrate (DH) process, a hemihydrate (HH) process, a dihydrate-hemihydrate (DHH) process, a hemihydrate-dihydrate (HDH) process, and a dihydrate attack-hemihydrate filtration (DA-HF) process.

4. The process of claim 1 wherein the calcium sulfate used in step (a) is obtained from a separation unit in the phosphoric acid production, obtained after a first separation from the phosphoric acid.

5. The process of claim 1 wherein the calcium sulfate used in step (a):
   is calcium sulfate filtercake;
   is from the phosphoric acid production directly or after one or more washes with water; and/or
   is stockpiled calcium sulfate from the phosphoric acid production.

6. The process of claim 1 comprising at least one of:
   wherein in step (a) the acid is added in such an amount that a weight ratio of solids to liquid in the suspension is in a range from 1/10 to 1/1;
   wherein the acid resulting from the treatment after step (a) is a 1 to 12 molar acid;

wherein the acid is hydrochloric acid, nitric acid, sulfurous acid, and/or sulfuric acid;

wherein the treating in step (a) is conducted at a temperature in a range from 15 to 100° C.; or wherein a duration of the treating in step (a) is in a range from 5 to 120 minutes.

7. The process of claim 1 wherein a $D_v(50)$ of a grain size distribution of the calcium sulfate obtained in step (b) is in a range of 0.5-100 µm.

8. The process of claim 1 comprising using the liquid phase obtained in step (b) as feedstock in the phosphoric acid production as a portion of sulfuric acid required to digest raw phosphate.

9. The process of claim 1 wherein at least one of:

the admixtures of step (c) are raw materials or compounds comprising one or more oxides of Si, Al, Fe, Ca, or precursors thereof;

carbon and/or hydrocarbons are mixed into the calcium sulfate as reducing agents; or the cement clinker produced in step (d) is used for cement production.

10. The process of claim 1 wherein the dry depositioning of particles from the sulfur dioxide in steps (e1) and/or (e3) is undertaken by means of a cyclone, settling separator, rotational flow separator, and/or electrofilter.

11. The process of claim 10 wherein step (e2) is undertaken by means of a Venturi scrubber, rotary scrubber, and/or jet scrubber, wherein residual moisture in the sulfur dioxide is removed by condensation and/or a wet electrofilter.

12. The process of claim 1 comprising separating nitrogen oxides from the sulfur dioxide in step (e4) by way of a breakdown of the nitrogen oxides to $N_2$ and $H_2O$.

13. The process of claim 1 wherein the purified calcium sulfate obtained in step (b), before being fed to step (c), is subjected to an additional purification step for removal of rare earths in which the purified calcium sulfate obtained in step (b) is treated with a liquid and the further-purified calcium sulfate is separated in solid form from the liquid phase in the suspension that is obtained, wherein the further-purified calcium sulfate is sent to step (c), with one or more rare earths being present in the liquid phase.

14. The process of claim 1 wherein an extent of purification of the calcium sulfate in step (a) is established taking into account impurities present in the admixtures used for the raw meal, wherein guide values for phosphorus and fluorine are observed for the cement clinker, which are not more than 1.0% by weight of $P_2O_5$ and/or not more than 0.5% by weight F, wherein a liquid budget of the phosphoric acid production is altered only insignificantly, if at all, by an integrated process because an input of liquid for purification of the calcium sulfate in the integrated process is coupled to the liquid budget of the phosphoric acid production.

15. A plant for production of sulfuric acid and cement clinker using calcium sulfate by the process of claim 1, wherein the calcium sulfate is formed and separated off as a solid by-product in phosphoric acid production in a reaction of raw phosphate with sulfuric acid to form phosphoric acid, wherein the plant comprises:

a calcium sulfate reaction unit for treating the calcium sulfate separated from the phosphoric acid therein with an acid to obtain a suspension comprising purified calcium sulfate;

a calcium sulfate separation unit for separating the purified calcium sulfate in solid form from a liquid phase of the suspension;

a raw meal mixing unit suitable for mixing the purified calcium sulfate separated off with admixtures and reducing agents therein to obtain a raw meal mixture for cement clinker production;

a cement clinker production unit comprising a preheater, at least one burner device, and a cooler that are suitable for preheating, burning, and cooling the raw meal mixture to obtain the cement clinker, forming sulfur dioxide as offgas;

a sulfur dioxide offgas purification plant that is suitable for removing impurities from the sulfur dioxide offgas, wherein the sulfur dioxide offgas purification plant is suitable for removing impurities from the sulfur dioxide offgas and includes:

a cyclone, rotational flow separator and/or dry electrofilter configured to dry deposit particles having a size greater than 100 µm and remove particles having a size less than 20 µm;

and a Venturi scrubber, quench/column scrubber and/or wet electrofilter to wet deposit particles having a size of 20 to 100 µm; and a sulfuric acid production plant configured to be supplied with the sulfur dioxide offgas that has been formed in the cement clinker production unit to produce sulfuric acid.

\* \* \* \* \*